United States Patent
Kim et al.

(10) Patent No.: US 7,046,876 B2
(45) Date of Patent: May 16, 2006

(54) INTERLEAVER FOR OPTICAL COMMUNICATION SYSTEM

(75) Inventors: Ki-Yeol Kim, Seoul (KR); Sung Wook Moon, Seoul (KR); Won Sang Yoo, Gyeonggi-do (KR)

(73) Assignee: LG Cable Ltd., Seoul (KR)

( * ) Notice: Subject to any disclaimer, the term of this patent is extended or adjusted under 35 U.S.C. 154(b) by 0 days.

(21) Appl. No.: 11/078,800

(22) Filed: Mar. 11, 2005

(65) Prior Publication Data

US 2005/0201688 A1    Sep. 15, 2005

(30) Foreign Application Priority Data

Mar. 12, 2004  (KR) ...................... 10-2004-0017081
Nov. 30, 2004  (KR) ...................... 10-2004-0099250

(51) Int. Cl.
*G02B 6/32* (2006.01)
(52) U.S. Cl. ............................. 385/33; 385/15; 385/31; 385/34; 398/79; 398/82; 398/85; 398/88
(58) Field of Classification Search ................. 385/15, 385/31, 33, 34; 398/79, 82, 85, 88
See application file for complete search history.

(56) References Cited

U.S. PATENT DOCUMENTS

| | | | |
|---|---|---|---|
| 6,839,485 B1 * | 1/2005 | Gardner et al. ................ | 385/33 |
| 6,885,821 B1 * | 4/2005 | Cooney et al. ................ | 398/45 |
| 2003/0103725 A1 * | 6/2003 | Li ................................... | 385/34 |
| 2005/0041290 A1 * | 2/2005 | Du et al. ....................... | 359/497 |

* cited by examiner

*Primary Examiner*—Kaveh Kianni
*Assistant Examiner*—Derek L. Dupuis
(74) *Attorney, Agent, or Firm*—Jones Day

(57) ABSTRACT

Disclosed is an interleaver for an optical communication system. A dual collimator is combined with a first optical fiber acting as a light input port and one end of a second optical fiber spaced from the first optical fiber, and switches light advancing along the first and second optical fibers into parallel light. A beam splitter is arranged so that one surface is opposite to the dual collimator, and transmits one half of an input light and reflects the other half of the input light. A single collimator is arranged opposite to the other surface of the beam splitter, and combined with the other end of the second optical fiber so as to switch light advancing toward the other end of the second optical fiber into parallel light. An output optical fiber is arranged opposite to the other surface of the beam splitter and acts as a light output port.

13 Claims, 5 Drawing Sheets

INTERLEAVER FOR OPTICAL COMMUNICATION SYSTEM

BACKGROUND OF THE INVENTION

1. Field of the Invention

The present invention relates to an interleaver for an optical communication system, and more particularly to an interleaver for an optical communication system, which is capable of reducing optical loss together with ensuring precise optical axis alignment and easy adjustment of a channel gap when separating channels for transmission of optical signals in WDM (Wavelength Division Multiplexing).

2. Description of the Related Art

Among the multiplexing methods for optical communication, WDM (Wavelength Division Multiplexing) uses a method of dividing signal channels and transmitting data without installation of an additional optical cable. Thus, WDM allows easy channel expansion and is suitable for communication networks capable of high speed and bulk transmission.

However, in case of WDM, if a communication standard is once fixed as, for example, DWDM (Dense Wavelength Division Multiplexing) of about 100 GHz or 200 GHz or CWDM (Coarse Wavelength Division Multiplexing) requiring to keep a channel gap of 20 nm, a system is configured using optical elements suitable for the standard. Thus, in order to use a new channel wavelength by setting an existing channel gap narrower, there should be provided an interleaver to be newly used in the overall signal channels for separating signal channels as shown in the waveform of FIG. 1. When such an interleaver is used, it is possible to adjust bands from 100 GHz to 50 GHz, or from 200 GHz to 100 GHz, or a channel gap from 20 nm to 10 nm. Thus, the interleaver may expand an effective channel region of WDM substantially in double.

U.S. Pat. No. 5,809,190 discloses a conventional configuration for an interleaver. In the US patent, two strands of optical fibers 41 and 42 are mutually fused so that a light advancing along one optical fiber 41 is partially moved to the other optical fiber 42, thereby enabling to obtain periodic filter characteristics by means of change of the intensity of light in correspondence to wavelength of an optical signal (see FIG. 2).

In addition, as another example of a conventional interleaver, U.S. Pat. No. 6,169,626 discloses a technique that employs the Michelson interferometer (see FIG. 3). This technique uses a method of selectively filtering wavelength of a corresponding signal according to constructive or destructive interference corresponding to phase difference of light by use of interleaver components 810 and 820 respectively provided with a beam splitter and a mirror.

However, the aforementioned interleaver technique employing the fusing method is not easy to ensure thickness representation and maintain an isotropic shape during welding, so it has weak points that polarization may be deteriorated and tolerance is small in optical axis alignment. In case of the interleaver technique employing the Michelson interferometer, a half of light returns toward a light input port, so it should be resigned to 3 dB optical losses. Thus, there is still a need to develop an interleaver with a new configuration capable of solving the problems.

SUMMARY OF THE INVENTION

The present invention is designed to solve the problems of the prior art, and therefore an object of the present invention is directed to implementing an interleaver for an optical communication system, which prevents deterioration of polarization characteristics for an optical fiber and also uses a light with plane wave so that tolerance is increased in optical axis alignment.

Another object of the invention is to provide an interleaver for an optical communication system, which may reduce an optical loss by re-inputting a light that returns toward a light input port.

In order to accomplish the above object, the interleaver for an optical communication system according to the present invention is implemented using a collimator and a beam splitter.

That is to say, in one aspect of the present invention, there is provided an interleaver that includes a dual collimator, a beam splitter, a single collimator, and an output optical fiber. The dual collimator combined with a first optical fiber acting as a light input port and one end of a second optical fiber spaced apart from the first optical fiber by a predetermined distance, and the dual collimator switches a light advancing along the first and second optical fibers into a parallel light. The beam splitter is arranged so that one surface is opposite to the dual collimator, and the beam splitter transmits one half of an input light and reflects the other half of the input light. In addition, the single collimator is arranged to be opposite to the other surface of the beam splitter, and the single collimator is combined with the other end of the second optical fiber so as to switch a light advancing toward the other end of the second optical fiber into a parallel light. The output optical fiber is arranged to be opposite to the other surface of the beam splitter and acts as a light output port. Here, the dual collimator, the beam splitter, the single collimator and the output optical fiber are arranged so that the first optical fiber and the single collimator are optical-axially aligned with the beam splitter interposed therebetween and one end of the second optical fiber and the output optical fiber are optical-axially aligned with the beam splitter interposed therebetween.

In addition, in another aspect of the present invention, there is also provided an interleaver that includes an input dual collimator, a beam splitter and an output dual collimator. The input dual collimator is combined with a first optical fiber acting as a light input port and one end of a second optical fiber spaced apart from the first optical fiber by a predetermined distance, and the input dual collimator switches a light advancing along the first and second optical fibers into a parallel light. The beam splitter is arranged so that one surface is opposite to the input dual collimator, and the beam splitter transmits one half of an input light and reflects the other half of the input light. In addition, the output dual collimator is arranged to be opposite to the other surface of the beam splitter, and the output dual collimator is combined with the other end of the second optical fiber and an output optical fiber spaced apart from the second optical fiber by a predetermined distance. The output optical fiber acts as a light output port. The output dual collimator also switches a light advancing along the second optical fiber and the output optical fiber into a parallel light. Here, the input dual collimator, the beam splitter and the output dual collimator are arranged so that the first optical fiber and the other end of the second optical fiber are optical-axially aligned with the beam splitter interposed therebetween and one end of the second optical fiber and the output optical fiber are optical-axially aligned with the beam splitter interposed therebetween.

Here, the beam splitter may be composed of first and second beam splitters. In this case, a gap between channel wavelengths may be adjusted by controlling the distance of two beam splitters.

Meanwhile, the beam splitter may be prepared so that a plurality of reflecting portions are arranged on a transparent substrate, and a total area the reflecting portions is corresponding to about a half of an area of the transparent substrate.

In a preferred embodiment of the present invention, the interleaver may be further provided with a circulator combined with at least one of the first optical fiber and the output optical fiber so as to re-input a light vanished out of an internal optical circulation system composed of the dual collimator, the beam splitter and the single collimator.

In addition, the interleaver of the present invention may further include a 3 dB coupler substantially provided to a front end of the first optical fiber so as to extract a half of all channels of input optical signals and inputting the half into the first optical fiber.

BRIEF DESCRIPTION OF THE DRAWINGS

Other objects and aspects of the present invention will become apparent from the following description of embodiments with reference to the accompanying drawing in which.

DESCRIPTION OF THE PREFERRED EMBODIMENT

Hereinafter, preferred embodiments of the present invention will be described in detail referring to the accompanying drawings. Prior to the description, it should be understood that the terms used in the specification and appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

Figure 1:
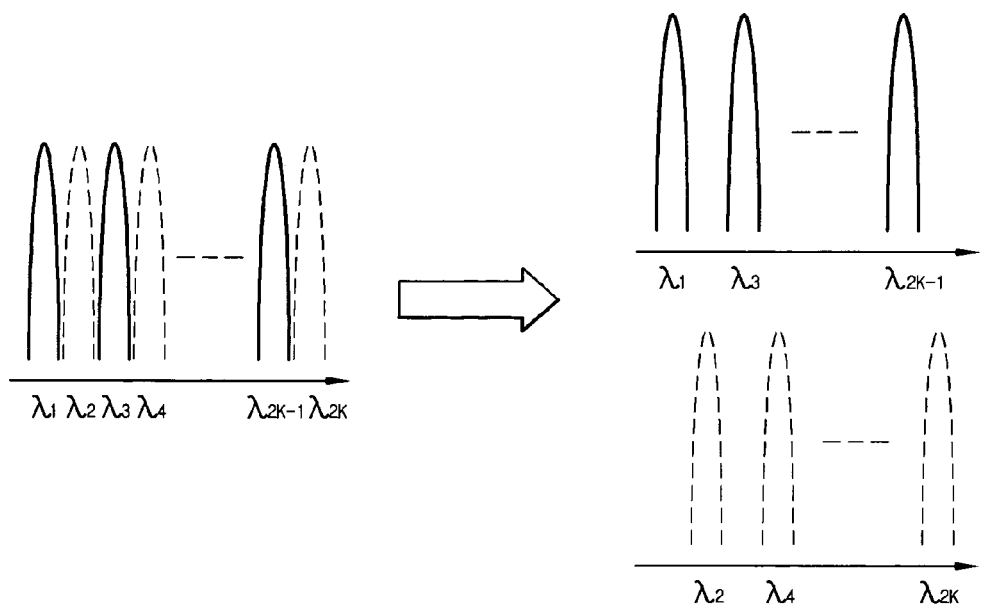
FIG. 1 is a waveform diagram schematically showing operation of a general interleaver.
Figure 2:
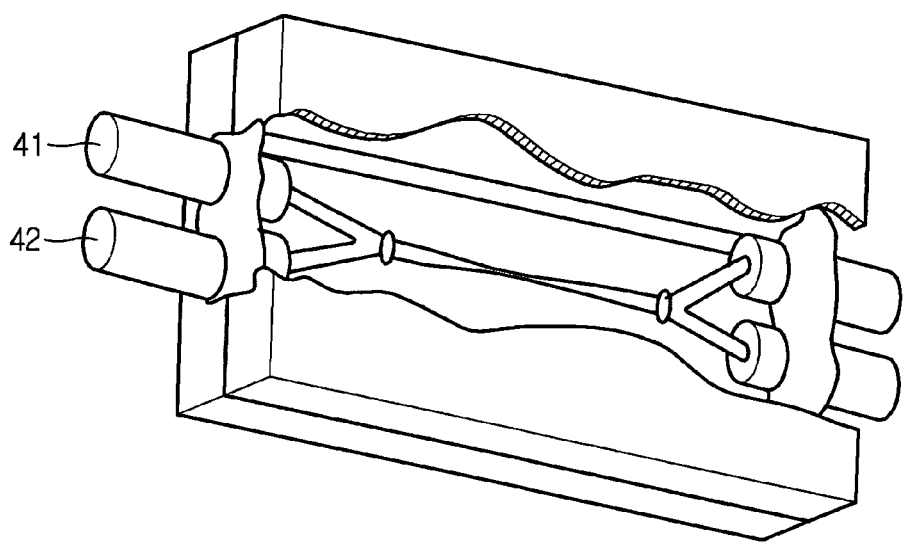
FIG. 2 is a partially sectioned perspective view showing an example of a conventional interleaver.
Figure 3:
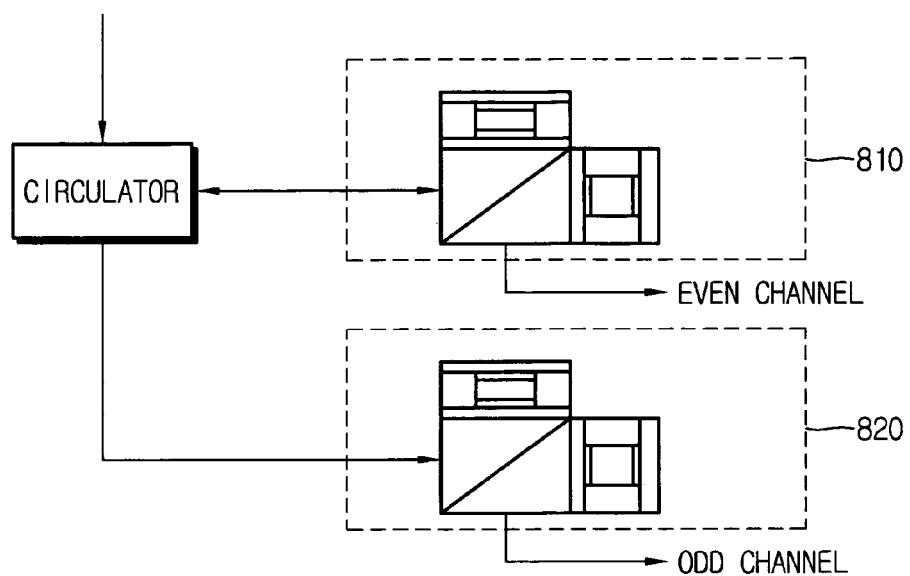
FIG. 3 shows another example of a conventional interleaver.
Figure 4:
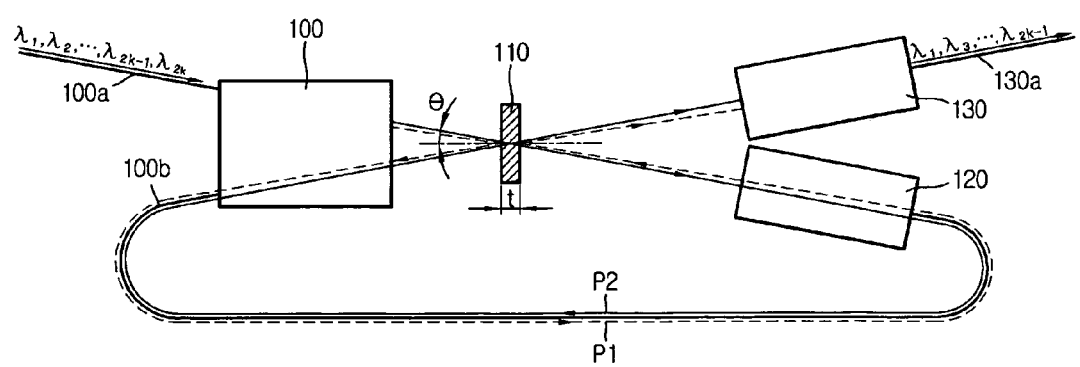
FIG. 4 is a schematic view showing an interleaver according to a preferred embodiment of the present invention.

FIG. 4 shows schematic configuration of an interleaver according to a preferred embodiment of the present invention.

Referring to FIG. 4, the interleaver of this embodiment includes a dual collimator 100 combined with a first optical fiber 100a acting as a light input port and one end of a second optical fiber 100b spaced apart from the first optical fiber 100a, a beam splitter 110 whose one surface is opposite to the dual collimator 100, a single collimator 120 opposite to the other surface of the beam splitter 110 and combined with the other end of the second optical fiber 100b, and an output optical fiber 130a opposite to the other surface of the beam splitter 110 for the purpose of light output.

The dual collimator 100 expands a light advancing along the optical fibers 100a and 100b to be switched into a parallel light, thereby substantially increasing tolerance in optical axis alignment. Preferably, the first and second optical fibers 100a and 100b are fixed to the dual collimator 100 with a distance of about 125 μm. In addition, the dual collimator 100 may be additionally provided with a capillary (not shown) corresponding to the optical fibers 100a and 100b and a GRIN (Gradient Index) lens (not shown) for switching a light passing through the capillary into a plane wave.

Figure 5:
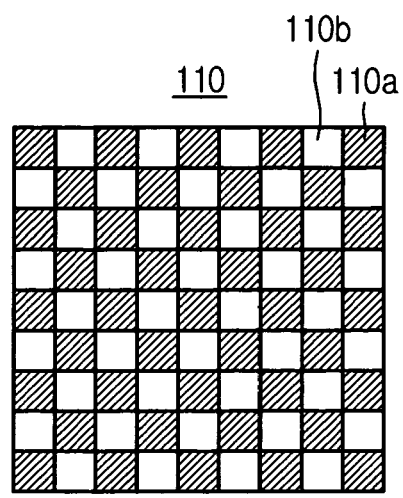
FIG. 5 is a plane view showing an example of a beam splitter of FIG. 4.

The beam splitter 110 is an optical element for transmitting 50% of the intensity of an input light and reflecting residual 50%. As shown in FIG. 5, on both surfaces of the beam splitter 110, reflecting portions 110a and transmitting portions 110b may be alternately formed repeatedly. A thin film may be coated on a transparent substrate, for example a glass substrate, to form the reflecting portion 110a. A total area of the reflecting portions 110a is substantially identical to a total area of the transmitting portions 110b. Such a beam splitter 110 is arranged so that its one surface is opposite to the dual collimator 100. Thus, the beam splitter 110 functions to transmit one half of a light input from one of the first and second optical fibers 100a and 100b and reflecting the other half of the light to the other one of the first and second optical fibers 100a and 100b.

Meanwhile, though the reflecting portions 110a and the transmitting portions 110b are shown in FIG. 5 to have a square shape, the shape of the reflecting portions 110a and the transmitting portions 110b is not limited to that case. That is, the reflecting portions 110a and the transmitting portions 110b may have other polygonal shapes such as a rectangle or a triangle as well as a stripe shape.

On the other surface of the beam splitter 110, a single collimator 120 is oppositely arranged so that a light advancing from the first optical fiber 100a of the dual collimator 100 through the beam splitter 110 may be input thereto. Here, the single collimator 120 may be configured to include a single capillary (not shown) and a GRIN lens (not shown), and in particular the second optical fiber 100b is connected thereto in correspondence to the capillary. Thus, the light input into the single collimator 120 is advanced toward the dual collimator 100 along the second optical fiber 120b, and then input to one surface of the beam splitter 110. To the contrary, the light input to the second optical fiber 100b of the dual collimator 100 is advanced toward the single collimator 120, and then input on the other surface of the beam splitter 110.

The light input on the other surface of the beam splitter 110 transmits the beam splitter 110 by half, and the other half is reflected toward an output optical fiber 130a acting as a light output port, and then finally output. Here, an output single collimator 130 is preferably provided to a light input portion of the output optical fiber 130a so as to expansively switch an input light into a parallel light.

According to such configuration, a path difference ΔL between a light (having a path P2), which is input to the first optical fiber 100a, passes through the single collimator 120, the second optical fiber 100b, the dual collimator 100 and the beam splitter 110, and then is input to the output optical fiber 130a, and a light (having a path P1), which is input the first optical fiber 100a, is reflected on the beam splitter 110, then passes through the dual collimator 100, the second optical fiber 100b, the single collimator 120 and the beam splitter 110, and then is input to the output optical fiber 130a, is given as the following equation 1. Thus, spatial frequency is changed according to the change of wavelength when an incident angle θ of a light input from the dual collimator 100 to the beam splitter 110 and a thickness t of the beam splitter 110 are adjusted, so it is possible to obtain a filtering characteristic according to wavelength.

$$\Delta L = |P1 - P2| = \frac{2t}{\cos\theta} \qquad \text{Equation 1}$$

Meanwhile, a wavelength gap Δλ between signal channels may be expressed as the following equation 2. Thus, it is possible to control the gap between channel wavelengths by adjusting an incident angle θ of a light input from the dual collimator 100 to the beam splitter 110 and a thickness t of the beam splitter 110. In particular, in case of using the beam splitter 110 made of glass as mentioned above, a stable path difference may be maintained since glass has substantially no thickness difference according to the change of temperature. Thus it is possible to obtain a product with good reliability. In addition, this is advantageous in obtaining a path difference for ensuring a desired optical wavelength characteristic owing to excellent workability.

$$\Delta\lambda = \frac{\lambda^2}{n\Delta L} \qquad \text{Equation 2}$$

Here, λ is a center wavelength, and n is a refractive index of a propagation medium.

Figure 6:
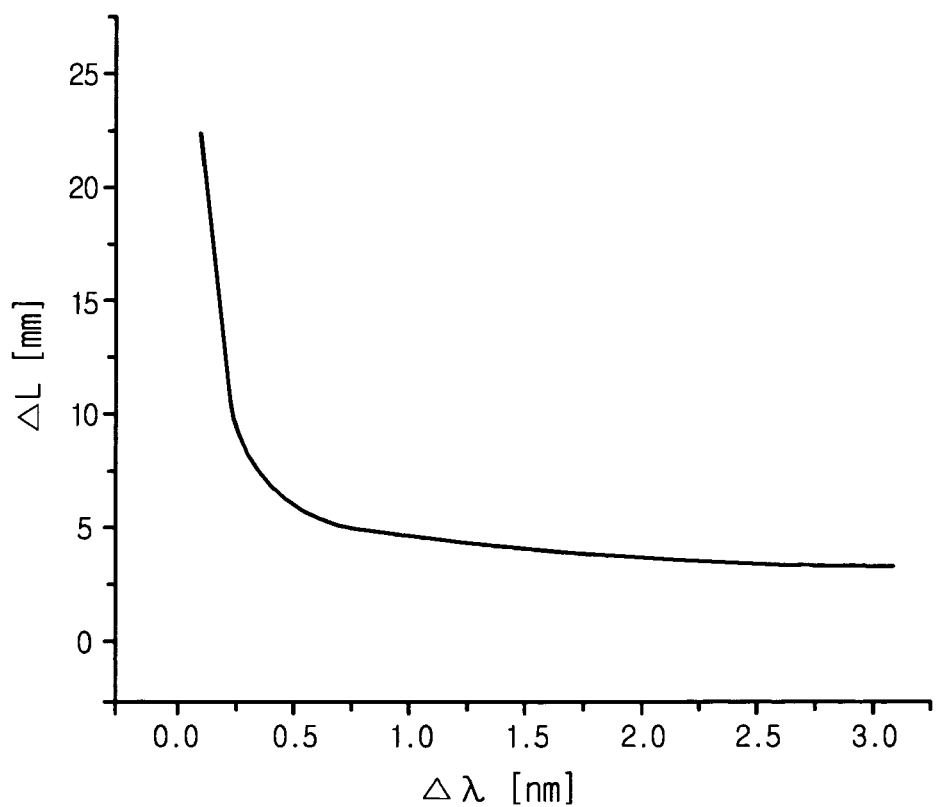
FIG. 6 is a graph illustrating the relation between an optical path difference and a channel gap.

FIG. 6 is a graph showing a relation between the optical path difference ΔL and the gap Δλ of channel wavelengths according to the equation 2. For example, in order to obtain a channel gap of 100 GHz (=0.8 nm), it would be understood that a thickness t of the beam splitter 110 is set to 1.499 mm so that the optical path difference ΔL is kept to 3 mm, in the case that an incident angle θ of a light input from the dual collimator to the beam splitter is 1.8 degrees.

Now, operation of the interleaver for an optical communication system according to this embodiment is described with reference to FIG. 4.

Entire channel wavelengths $\lambda_1, \lambda_2, \lambda_3, \ldots, \lambda_{2k-1}, \lambda_{2k}$ are divided by an interleaver component having the dual collimator 100, the beam splitter 110, the single collimator 120 and the output single collimator 130, so some channel wavelengths, for example odd channel wavelengths $\lambda_1, \lambda_3, \ldots, \lambda_{2k-1}$. are selectively extracted and output to the output optical fiber 130a combined to the output single collimator 130.

For this operation, a light input through the first optical fiber 100a of the dual collimator 100 is reflected on one surface of the beam splitter 110 toward the second optical fiber 100b by half (see the path P1), and the other half passes through the beam splitter 110 to be input to the single collimator 120 (see the path P2).

Subsequently, the light having the path P2 is switched into a plane wave by means of the single collimator 120, and output out of the dual collimator 100 via the second optical fiber 100b. After that, the light is partially output to the output optical fiber 130a through the output single collimator 130, and the residual light is reflected on one surface of the beam splitter 110 and then vanished to the first optical fiber 100a of the dual collimator 100.

Meanwhile, the light having the path P1, which is reflected on one surface of the beam splitter 110 and then advances along the second optical fiber 100b, passes through the single collimator 120. After that, the light is partially reflected on the beam splitter 110 and then output to the output optical fiber 130a via the output single collimator 130, and the residual light passes through the beam splitter 110 and is then vanished to the first optical fiber 100a of the dual collimator 100. Here, light vanished through the first optical fiber 100a among the lights having the paths P1 and P2 is preferably re-input to the interleaver component by means of a circulator 140 (see FIG. 9) combined with the first optical fiber 100a.

Figure 7:
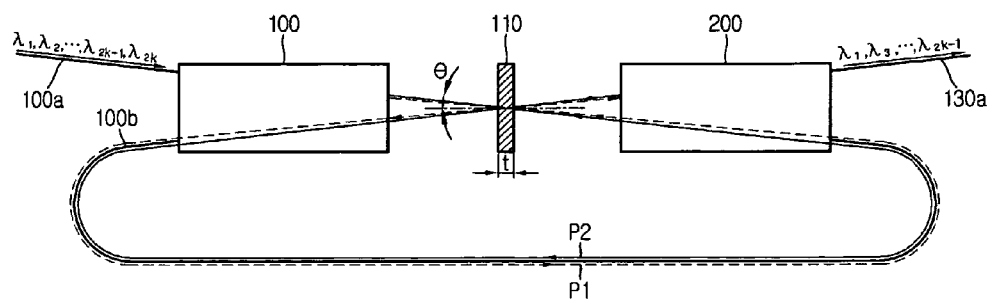
FIG. 7 is a schematic view showing an interleaver according to another embodiment of the present invention.

FIG. 7 shows an interleaver according to another embodiment of the present invention. The interleaver of this embodiment is different from the former one in the following points.

Basic configuration and operating principle of the interleaver according to this embodiment are basically identical to that of the former embodiment. However, the interleaver of this embodiment is different from the former one in the point that a dual collimator 200 combined to the output optical fiber 130a and the second optical fiber 100b is provided at an output portion. Thus, according to this embodiment, a light input to the output optical fiber 130a may be switched into a parallel light. In addition, this embodiment allows easy manufacture and alignment by configuring the input portion and the output portion identically.

Figure 8:
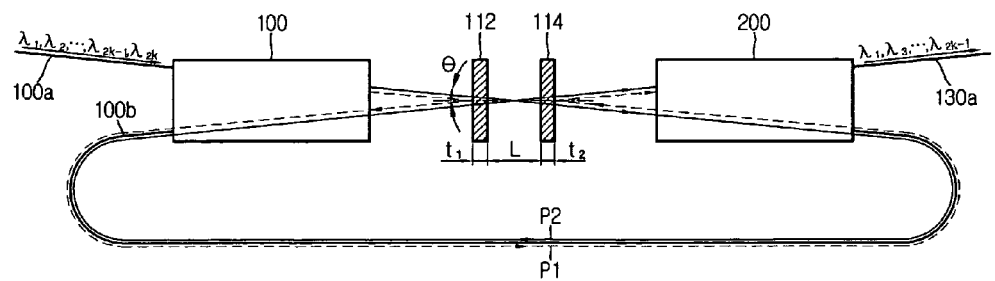
FIG. 8 is a schematic view showing an interleaver according to still another embodiment of the present invention.

FIG. 8 shows an interleaver according to still another embodiment of the present invention. The interleaver of this embodiment is different from the former ones in the following points.

The interleaver of this embodiment includes the dual collimator 200, described with reference to FIG. 7, and is also provided with two beam splitters, differently from the former embodiments. That is to say, the beam splitter of this embodiment includes a first beam splitter 112 and a second beam splitter 114 arranged with a predetermined distance L.

Here, the first and second beam splitters 112 and 114 basically have the same configuration as that shown in FIG. 5. However, reflecting portions 110a of the first beam splitter 112 are formed only on a surface opposite to the input dual collimator 100, and reflecting portions 110a of the second beam splitter 114 are formed only on a surface opposite to the output dual collimator 200. Thus, the first and second beam splitters 112 and 114 make reflection only on the surfaces where the reflecting portions 110a are formed, and a path difference ΔL of two lights having the paths P1 and P2 may be expressed like the following equation 3.

$$\Delta L = |P1 - P2| = 2\left(\frac{L}{\cos\theta} + \frac{t1}{\cos\theta} + \frac{t2}{\cos\theta}\right) \quad \text{Equation 3}$$

Thus, according to this embodiment, a gap between channel wavelengths is determined by adjusting thickness t1 and t2 of two beam splitters, a distance L between two beam splitters, and an incident angle θ of a light input from the dual collimator 100 to the beam splitter 112. Accordingly, the gap between channel wavelengths is adjustable.

Meanwhile, though not shown in the drawings, the interleaver shown in FIG. 4 may also employ two beam splitters, like the case shown in FIG. 8.

Figure 9:
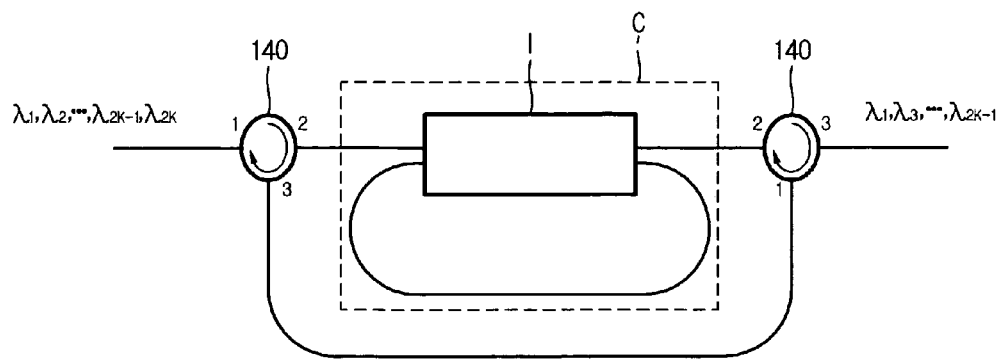
FIG. 9 shows an interleaver provided with a circulator according to an embodiment of the present invention.

In addition, as shown in FIG. 9, the interleaver of the present invention may be further provided with a circulator 140, or preferably circulators 140 that are symmetrically combined to both of the first optical fiber 100a and the output optical fiber 130a so that a light vanished out of an internal optical circulation system C configured on the basis of the interleaver component I is re-input into the internal optical circulation system C. This circulator 140 preferably adopts a common three-port circulator. Here, the interleaver component I is an interleaver component including the dual collimator 100, the beam splitter 110, the single collimator 120, the output single collimator 130 and so on as shown in FIG. 4, or an interleaver component configured as shown in FIG. 7 or 8.

Figure 10:
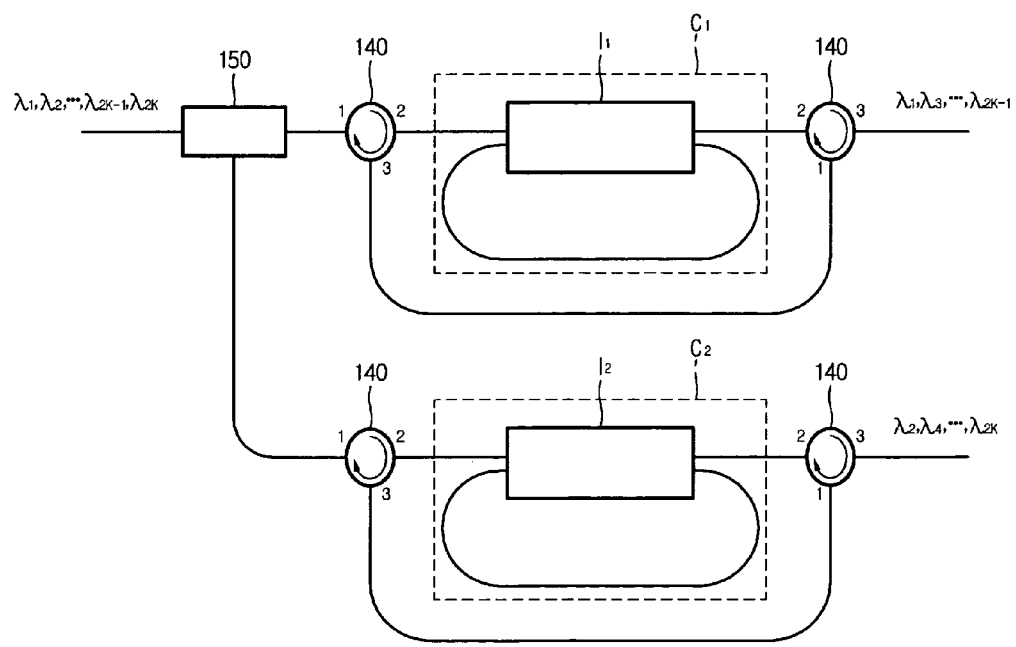
FIG. 10 shows an interleaver provided with a 3 dB coupler according to an embodiment of the present invention.

Furthermore, as shown in FIG. 10, the interleaver of the present invention may further provided with a 3 dB coupler 150 substantially combined with a front end of the first optical fiber 100a so as to extract only a half of the total intensity of an input light and then input the half to the first optical fiber 100a. Thus, when two set of interleaver components $I_1$ and $I_2$ and internal optical circulation systems $C_1$ and $C_2$ based on the interleaver components are configured using the 3 dB coupler 150 as a diverging point, both interleaver components $I_1$ and $I_2$ may selectively extract even channels and odd channels from the whole channels. Here, the interleaver components $I_1$ and $I_2$ may employ an interleaver component including the dual collimator 100, the beam splitter 110, the single collimator 120, the output single collimator 130 and so on as shown in FIG. 4, or an interleaver component configured as shown in FIG. 7 or 8.

Though the present invention has been described above using the limited embodiments and drawings, it should be understood that various changes and modifications within the technical spirit of the invention and the equivalent scope of the appended claims will become apparent to those skilled in the art from this detailed description.

APPLICABILITY TO THE INDUSTRY

As described above, the interleaver for an optical communication system according to the present invention has excellent polarization characteristics since it does not require fusion-splicing of optical fibers. In addition, tolerance is increased since a signal light is used after being switching into a plane wave, and it is possible to conveniently obtain a filtering characteristic corresponding to channel wavelength by adjusting a thickness of the beam splitter, a distance between the beam splitters and an incident angle of a light onto the beam splitter.

In addition, the interleaver of the present invention enables a light vanished to the light input port to be mostly re-input into the internal circulation system, thereby reducing optical losses.

What is claimed is:

1. An interleaver, comprising:
   a dual collimator combined with a first optical fiber acting as a light input port and one end of a second optical fiber spaced apart from the first optical fiber by a predetermined distance, the dual collimator switching a light advancing along the first and second optical fibers into a parallel light;
   a beam splitter arranged so that one surface is opposite to the dual collimator, the beam splitter transmitting one half of an input light and reflecting the other half of the input light;
   a single collimator arranged to be opposite to the other surface of the beam splitter, the single collimator being combined with the other end of the second optical fiber so as to switch a light advancing toward the other end of the second optical fiber into a parallel light; and
   an output optical fiber arranged to be opposite to the other surface of the beam splitter and acting as a light output port,
   wherein the dual collimator, the beam splitter, the single collimator and the output optical fiber are arranged so that the first optical fiber and the single collimator are optical-axially aligned with the beam splitter interposed therebetween and one end of the second optical fiber and the output optical fiber are optical-axially aligned with the beam splitter interposed therebetween.

2. The interleaver according to claim 1, further comprising:
   an output single collimator combined with the output optical fiber so as to switch a light input from the other surface of the beam splitter into a parallel light.

3. The interleaver according to claim 1, wherein the beam splitter includes:
   a first beam splitter arranged to be opposite to the first optical fiber and one end of the second optical fiber, the first beam splitter transmitting one half of a light input from the first optical fiber and reflecting the other half of the light; and
   a second beam splitter arranged to be opposite to the other end of the second optical fiber and the output optical fiber, the second beam splitter transmitting one half of a light input from the other end of the second optical fiber and reflecting the other half of the light.

4. The interleaver according to claim 3,
   wherein the first and second beam splitters are arranged so that a distance therebetween is adjustable.

5. The interleaver according to claim 1, wherein the beam splitter includes:
   a transparent substrate; and
   a plurality of reflecting portions arranged on the transparent substrate so that a total area thereof is corresponding to about a half of an area of the transparent substrate.

6. The interleaver according to claim 1, further comprising:
   a circulator combined with at least one of the first optical fiber and the output optical fiber so as to re-input a light vanished out of an internal optical circulation system composed of the dual collimator, the beam splitter and the single collimator.

7. The interleaver according to claim 1, further comprising:
   a 3 dB coupler substantially provided to a front end of the first optical fiber so as to extract a half of overall channels of input optical signals and inputting the half into the first optical fiber.

8. An interleaver, comprising:
an input dual collimator combined with a first optical fiber acting as a light input port and one end of a second optical fiber spaced apart from the first optical fiber by a predetermined distance, the input dual collimator switching a light advancing along the first and second optical fibers into a parallel light;
a beam splitter arranged so that one surface is opposite to the input dual collimator, the beam splitter transmitting one half of an input light and reflecting the other half of the input light; and
an output dual collimator arranged to be opposite to the other surface of the beam splitter, the output dual collimator being combined with the other end of the second optical fiber and an output optical fiber spaced apart from the second optical fiber by a predetermined distance and acting as a light output port, the output dual collimator switching a light advancing along the second optical fiber and the output optical fiber into a parallel light,
wherein the input dual collimator, the beam splitter and the output dual collimator are arranged so that the first optical fiber and the other end of the second optical fiber are optical-axially aligned with the beam splitter interposed therebetween and one end of the second optical fiber and the output optical fiber are optical-axially aligned with the beam splitter interposed therebetween.

9. The interleaver according to claim 8, wherein the beam splitter includes:
a first beam splitter arranged to be opposite to the first optical fiber and one end of the second optical fiber, the first beam splitter transmitting one half of a light input from the first optical fiber and reflecting the other half of the light; and
a second beam splitter arranged to be opposite to the other end of the second optical fiber and the output optical fiber, the second beam splitter transmitting one half of a light input from the other end of the second optical fiber and reflecting the other half of the light.

10. The interleaver according to claim 9,
wherein the first and second beam splitters are arranged so that a distance therebetween is adjustable.

11. The interleaver according to claim 8, wherein the beam splitter includes:
a transparent substrate; and
a plurality of reflecting portions arranged on the transparent substrate so that a total area thereof is corresponding to about a half of an area of the transparent substrate.

12. The interleaver according to claim 8, further comprising:
a circulator combined with at least one of the first optical fiber and the output optical fiber so as to re-input a light vanished out of an internal optical circulation system composed of the input dual collimator, the beam splitter and the output dual collimator.

13. The interleaver according to claim 8, further comprising:
a 3 dB coupler substantially provided to a front end of the first optical fiber so as to extract a half of overall channels of input optical signals and input the half into the first optical fiber.

* * * * *